United States Patent [19]
Adams

[11] 4,096,777
[45] Jun. 27, 1978

[54] HAND POWER TABLE SAW

[76] Inventor: Charles Lee Adams, Rte. 6, Fayetteville, Ark. 72701

[21] Appl. No.: 749,111

[22] Filed: Dec. 9, 1976

[51] Int. Cl.$^2$ ............................................ B23D 49/10
[52] U.S. Cl. ....................................... 83/762; 83/455; 83/464; 83/468; 269/288; 269/295
[58] Field of Search ............... 269/87.2, 288, 290–295; 83/455, 464, 467, 468, 762, 764, 743, 745, 821

[56] References Cited

U.S. PATENT DOCUMENTS

| | | | |
|---|---|---|---|
| 305,563 | 9/1884 | Baer | 83/468 |
| 635,884 | 10/1899 | Waltz | 269/87.2 |
| 1,370,431 | 3/1921 | Goodfellow | 269/87.2 X |
| 1,520,149 | 12/1924 | Shockey | 269/87.2 X |
| 2,531,149 | 11/1950 | Melchor | 83/455 |
| 2,747,625 | 5/1956 | Small | 83/468 |

*Primary Examiner*—J. M. Meister
*Attorney, Agent, or Firm*—Robert R. Keegan

[57] ABSTRACT

There is disclosed woodworking apparatus which is handpowered but permits accurate cuts by unskilled persons comparable to those which might be made by a radial arm or table saw. The apparatus includes a guide in which a handsaw is retained and restrained for cutting motion along the straight line, a supporting surface to support a workpiece in relation to the handsaw, and guides which co-operate with rulers to permit presetting of the apparatus for a desired cut, together with clamping devices which hold the workpiece to the table securely against the motion of the handsaw, at the same time avoiding interference of the clamps with the handsaw as it passes through the workpiece. The guide for the handsaw is formed of very rigid structural material such as steel angle iron which is faced with a plastic material of moderate hardness that resists abrasion or cutting by the handsaw to a considerable degree but is not so hard as to rapidly dull or distort the teeth of the handsaw.

17 Claims, 4 Drawing Figures

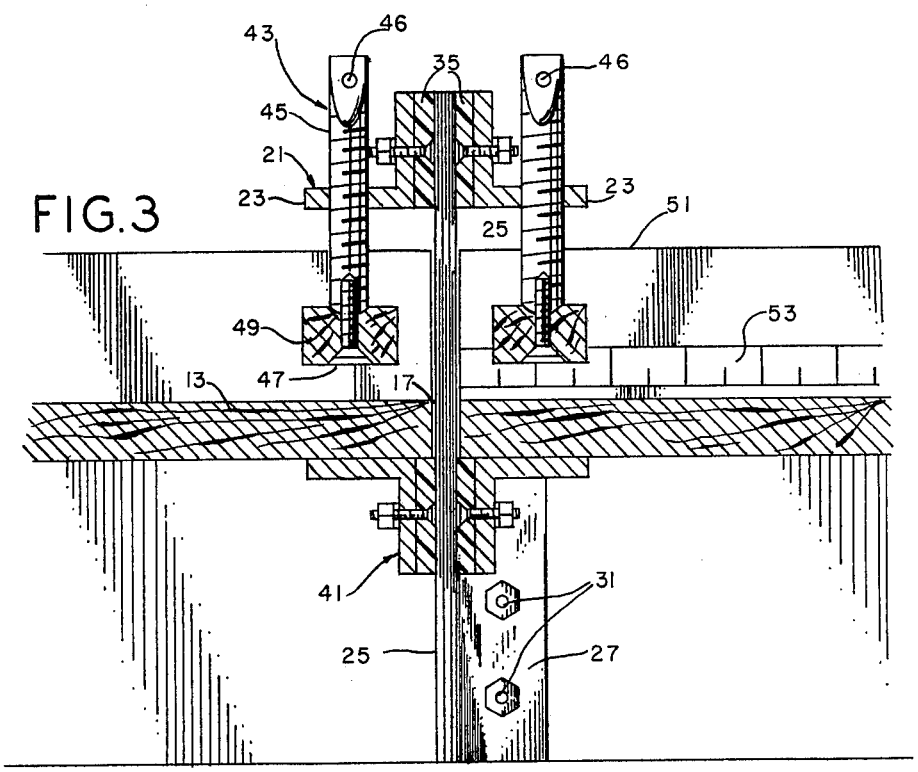
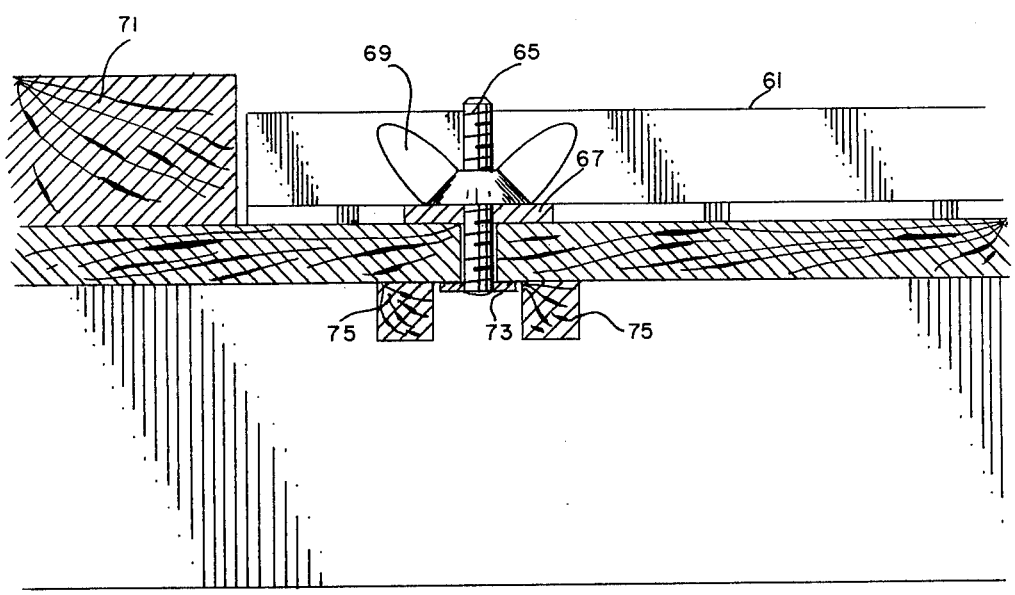
FIG.4

HAND POWER TABLE SAW

Woodcraft and carpentry has been greatly aided by power saw equipment such as table saws and radial arm saws which permit highly accurate cuts in wood or similar material without the necessity of great hand skill or dexterity on the part of the operator. Heretofore, however, the facility in woodcraft which these power tools have provided has been unavailable to young woodcraft workers and others for whom the dangers associated with operating such power equipment cannot be avoided or reduced to an acceptable degree.

It is the purpose of the present apparatus to provide equipment for such youthful craftsmen which has the advantages of producing accurate well-aligned cuts in wood without the necessity for a high degree of manual skill with a handsaw. Physical strength required for sawing with the apparatus is also minimized because one may readily use two hands to impart the necessary reciprocating motion to the saw since the workpiece being cut is firmly held by the apparatus. Rulers are incorporated in the apparatus so that the guides may be preset to a desired measurement as is commonly done with power tools. The guides also assure a "square" cut across the workpiece and through a workpiece. Long cuts may also be made, and these are assured to be parallel to the opposite edge of the workpiece where desired.

Of course, miter boxes of numerous styles have been employed to aid in making accurate right angle cuts or cuts of other angles, but miter boxes and similar aids fall far short of the present apparatus in providing youthful or other craft workers of very limited manual skills with practical equipment for truly accurate and precise woodwork.

In the invention a number of features contribute to the overall effectiveness of the apparatus which makes it possible for a child, of six or eight years of age, for example, to make cuts in workpieces for woodcraft projects with an accuracy to 1/32 of an inch and with true right angles to within about 1°. The basic structure of the apparatus is a work table which will preferably be of a heighth substantially below the waist of a small child, about 18 inches or less. In some cases, the table will be made still lower so that it will be safe and convenient for a child to stand on the table in order to most effectively operate the handsaw. An essential feature of the apparatus is the handsaw guide, which is very rigidly secured to the table and is not adjusted during normal operation of the apparatus. The guide restrains the handsaw so that the cut is made in a pre-determined plane with respect to the work table. At the same time, the guide permits free movement of the handsaw, and the force required to operate the handsaw is no greater than if the saw were being used freely in the usual manner. Guide blocks are provided on the table which are fixed relative to the saw guide and arranged so that a workpiece placed against the permanent table guide will have one side precisely at a right angle to the plane of cut of the handsaw. The plane of cut of the handsaw is also controlled to be at right angles to the table, i.e., vertical.

Another guide or fence may be provided which is adjustable and which may readily be adjusted parallel to the plane of cut for making long or "rip" cuts. Preferably a scale in the form of a tape measure is permanently secured to one or more of the permanent guide blocks and a clamp stop is provided to preset the apparatus to facilitate placing a workpiece to produce the desired finished length after cutting.

An important feature of the invention is the provision of screw clamps which virtually immovably secure the workpiece relative to the handsaw guide and which neither mar the workpiece nor interfere with the handsaw. The combination of the above features makes it possible for a youthful craftsman who could not be permitted to have access to power tools to nevertheless accomplish woodcraft projects which are significantly above a trivial level, highly educational and gratifying in result.

In addition to providing the above described features and advantages, it is the object of the present invention to provide hand-powered saw apparatus which is safe for use by youthful, relatively unskilled craftsmen and which is capable of producing very accurate results.

It is another object of the present invention to provide hand-powered table saw apparatus with a rigid saw guide restraining substantially the full width of a hand saw blade including both the back and the teeth and yet which permits free action of the saw with little dulling or other adverse effect on the saw teeth.

It is still another object of the present invention to provide hand-powered saw apparatus with saw guides both above and below a table surface and which is supported above the table surface a sufficient distance to accomodate the thickness of the thickest workpiece to be cut.

It is yet another object of the present invention to provide a hand-powered saw apparatus with a saw guide to restrain a handsaw to a particular plane relative to a work surface and to provide screw clamps for substantially immovably clamping a workpiece to said work surface to accurately determine the plane of cut through said workpiece.

Other objects and advantages of the present invention will be apparent from consideration of the following description in conjunction with the appended drawings in which:

FIG. 3 is a sectional fragmentary view taken along the line 3—3 in FIG. 1; and

FIG. 4 is a sectional fragmentary view of the apparatus taken along line 4—4 in FIG. 2.

Figure 1:
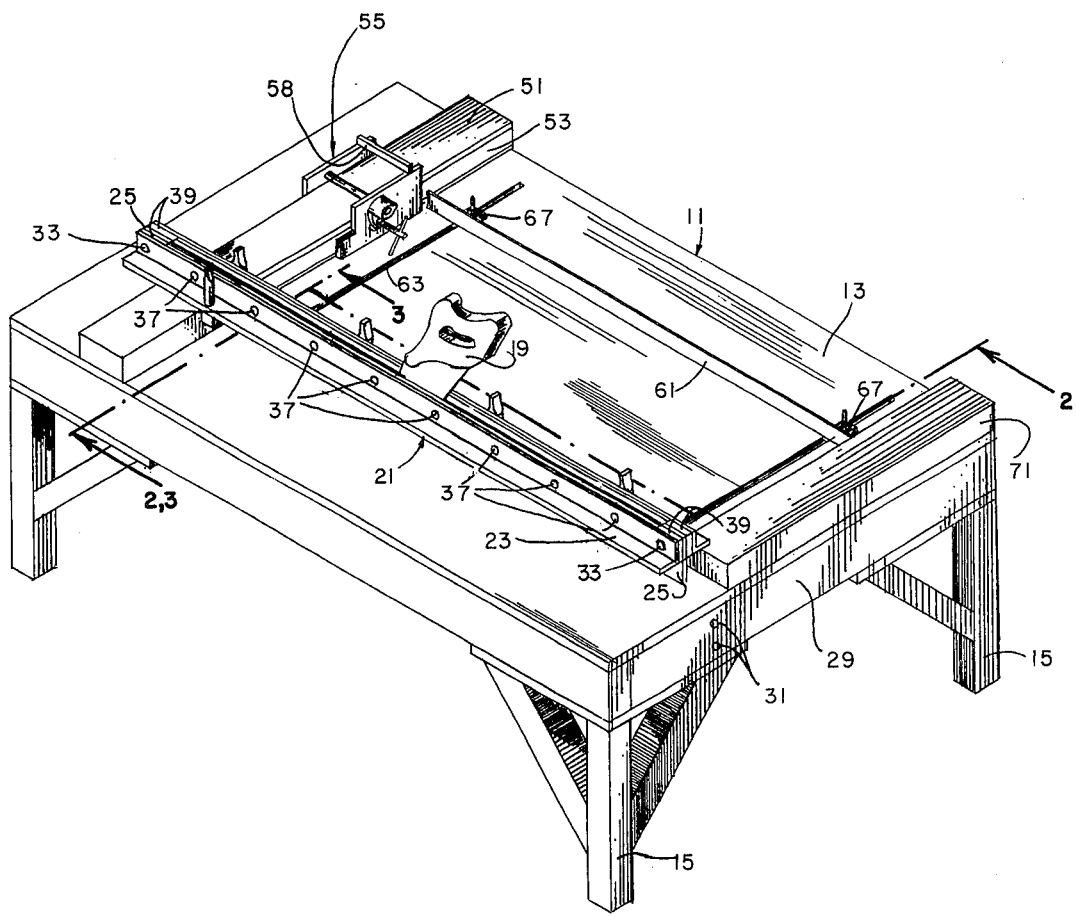
FIG. 1 is an isometric view of apparatus according to the present invention.

Referring to FIG. 1, a hand power table saw according to the invention is shown at 11. It includes a table structure having a table surface 13 and legs 15. The table portion of the apparatus may be constructed of wood, steel or other suitable materials as may be the legs 15.

Preferably the legs 15 will be quite rigid and rugged so that the table structure will support at least one hundred to two hundred pounds. In this manner the normally youthful operators of the apparatus may be permitted and even encouraged to stand on the table top to increase the leverage and force with which they are able to operate the saw.

Figure 2:
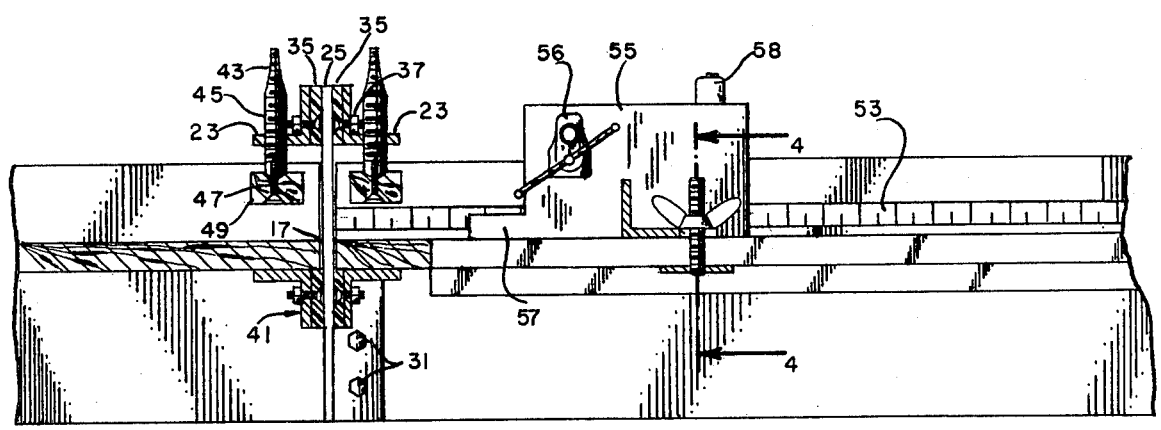
FIG. 2 is a sectional fragmentary view of a portion of the apparatus of FIG. 1 taken along the line 2—2 in FIG. 1.

In FIG. 2 there will be seen a slot 17 which runs most of the length of the table surface 13 (about 3 feet, for example). The slot 17 may be approximately one-quarter inch in width and permits a handsaw 19 to be operated through the table surface 13.

The table top 13 may advantageously be covered with quarter-inch masonite (not shown) which will provide a hard surface more resistant to dents, scratches, and cuts. The masonite is preferably omitted on the table to the front of slot 17 and the different level allows material being ripped to bend down and prevents pinching of the saw. A strip of masonite (not shown) about six inches wide at the left will make the table level the same on both sides of slot 17 in the portion used for cross cutting.

The hand saw 19 may be selected from the available varieties of hand saws and should be selected with a view to the operator's age and physical development. For children of ages approximately five to ten years, an eight-point or 11-point crosscut saw from twenty to twenty-six inches long has been found quite suitable. Extending parallel to and above the slot 17 is a saw guide structure 21. This structure includes a pair of angle irons 23 which give it great rigidity.

The sole support for the angle irons 23 is a pair of uprights 25 which may be formed of steel with a thickness of about a quarter of an inch and a width of about two inches. As shown in FIG. 3 the uprights 25 have flanges 27, and the flanges 27 are bolted to the ends 29 of the apparatus 11 by carriage bolts 31 or secured by other suitable means. The angle irons 23 are secured to uprights 25 by machine bolts 33. Against each of the vertical surfaces of the angle irons 23 is secured a liner 35 of rigid plastic material such as Plexiglass polymethyl methacrylate or other clear acrylic resin sheet. The liners 35 may be formed of sheet material from one-eighth to three-eighths inch in thickness and may be of a variety of materials not limited to plastics. Materials for the liners 35 should be moderately hard, preferably harder than soft wood and softer than mild steel. Material with this degree of hardness will not too rapidly be abraded by the action of the teeth of the saw and at the same time will not be sufficiently hard to dull the saw teeth too rapidly.

Liners 35 may be secured to the angle irons 23 in any desired fashion, but preferably are removably attached by bolts or the like. Thus for illustration the liners 35 are shown in FIG. 2 attached to angle irons 23 by bolts 37. Bolts 37 have their heads countersunk below the inner surface of the liners 35 so that they do not interfere with the blade of the saw 19.

Liners 35 do not extend to the end of the angle irons 23 so that clearance is provided for uprights 25. A soft stop of wood or plastic (not shown) may be inserted and may be glued, bolted or otherwise secured at the ends of liners 35 to prevent the saw teeth from striking metal uprights 25. The proper clearance between the inner surfaces of liners 35 is obtained by spacers 39 held in place between upright 25 and angle irons 23 by bolts 33. The spacers may be made of shimstock or other sheet metal with various thicknesses from (1/32) to (1/8) inch approximately.

By placing an appropriate number of spacers of the proper thickness between an angle iron 23 and an upright 25 the desired clearance between liners 35 for a particular saw may be achieved. The saw should move freely between liners 35 without binding, but there should be little or no play to prevent the saw from moving out of alignment. The spacing might be about one-eighth inch (not shown to scale in FIGS. 2 and 3). The spacers 39 rather than being rectangular as shown may also be in the form of round sheet metal washers. The spacers 39 serve not only to provide adjustment for the width of the saw slot 25 but also permit fine adjustment of the angular position of saw guide 21. This makes it possible to assure that the cut of the saw will be accurate to about (1/32) of an inch over the active length of the saw guide structure which is about three to five feet.

In addition to the saw guide structure 21 supported above the table surface 13 there is a substantially identical lower saw guide structure 41 located below table surface 13 and arranged in an inverted relationship compared to that of saw guide structure 21. Saw guide structure 41 is secured to uprights 25 in the same fashion as described above for saw guide structure 21 and thus has the adjustability characteristic of the upper saw guide structure 21. Furthermore, one of the saw guide structures 21 or 41 may be adjusted laterally by arrangement of spacers to assure that the blade of saw 19 is very accurately perpendicular to table surface 13.

In addition to serving to guide the hand saw, the guide structure 21 also acts as a frame for clamping devices to hold the workpiece in place while the sawing operation is accomplished. Several screw clamps 43 are provided for clamping workpieces of various sizes. It should be understood that the workpiece may be a board of various thicknesses up to about 2 inches or a piece of plywood or any similar material that may be cut with a conventional hand saw. Each of the screw clamps 43 consists of a threaded shaft which is illustrated as made from a half-inch bolt or threaded rod. A tapped hole in the angle iron 23 accepts the threaded shaft 45; the bottom of the shaft 45 is rounded and is tapped to accept a bolt 47 illustrated as a number 10-32 bolt with an oval head. A hardwood block 49 of three-quarters inch thickness and one and one-quarter inches on a side is secured to the end of the shaft 45 by means of the bolt 47. The block 49 has a round depression to accept the rounded end of shaft 45. The block 49 is loosely attached to the shaft 45 due to the excess length of bolt 47 relative to the depth of the tapped hole in shaft 45. Furthermore, the hole in block 49 is preferably slightly oversized. Thus when the clamp is tightened the block 49 is self-adjusting to the surface of the workpiece being sawed and consequently will not mar the work.

Near the far end of the table as viewed in FIG. 1 is a guide block 51. It is permanently and firmly secured to the table by nails, bolts or other suitable means and is oriented at a right angle to the guide structure 21. On the guide block 51 there is secured a scale in the form of a metal tape measure 53. The tape measure is preferably secured in a shallow mortise in block 51 so that boards or other workpieces guided along the block 51 bear against the block rather than against the scale 53.

An adjustable stop clamp 55 is arranged to grip the sides of the block 51 and thus to be securely clamped in place. Any suitable clamp mechanism such as a conventional pipe clamp mechanism 56 may be utilized to bring the respective sides of the stop clamp structure together to frictionally engage the guide block 51. The two plates of clamp 55 also are held loosely together by arm 58.

The forward end of the stop clamp 55 is provided with a projection 57 which is high enough to permit the front edge to be read against scale 53 and at the same time low enough to fit under the tightened position of screw clamps 43 for all except the very thinnest of materials.

Assume, for example, that it is desired to cut a one by two board to a length of ten inches. Assuming that one end of the board is already cut square, then the first step would be to loosen the stop clamp 55 by means of the clamp mechanism 56. Stop clamp 55 would then be adjusted along block 51 until the projection 57 at its left-hand extremity was exactly aligned with the ten-inch mark on scale 53.

Clamping mechanism 56 would then be tightened so that stop clamp 55 would be securely fixed relative to block 51 and, of course, relative to saw guide 21. The piece of one-by-two stock to be cut to ten inches would then be placed under the saw guide 21 with the square cut end against the left end of projection 57 of stop clamp 55. The stock to be cut would then be held against projection 57 and against the side of block 51 while screw clamps 43 were tightened down to hold the stock in place. Screw clamps 43 may be provided with handles (not shown) or may be tightened by inserting nails through openings 46 to increase leverage for tightening the screw clamps.

Saw 19 is then placed in slot 25 to the left (as shown in FIG. 1) of the location of the stock to be sawed, and the stock is then sawed by hand power with the saw blade being guided by saw guide 21 and lower saw guide 41. After the cut has been made through the stock, the screw clamps 43 are loosened and the stock and waste is removed.

The apparatus thus far described is fully adequate for making accurate short to moderate cuts in stock of various thickness ranging from thin plywood to about the thickness of two-inch dimensional lumber (i.e., about one and one-half to three-quarters inches). For making longer cuts in plywood sheet or for ripping longer pieces of lumber, the portions of the apparatus yet to be described are more convenient. In the apparatus illustrated in FIG. 1 there is provision for both the crosscut operation already described and the ripping or long cut operation yet to be described, and the apparatus for use in one operation may be removed or adjusted to be out of the way while the other operation is taking place. However, it should be understood that in many cases it would be more practical to have two separate table saw units, one of which was set up only for the crosscut operation and the other set up only for the long-cut or ripping operation. Thus the table saw for the crosscut operation would consist essentially of the apparatus already described above and would not require the features to be described below.

For long cuts and rip cuts the apparatus of FIG. 1 is provided with an adjustable fence 61 the details of which may best be seen in FIG. 4. Table surface 13 is provided with a pair of slots 63 through which extend bolts 65 by means of which fence 61 is secured to and clamped to the table surface.

Fence 61 is preferably formed of steel angle iron for rigidity, and in the arrangement shown, two flanges 67 are welded or otherwise secured to fence 61 and are provided with holes to accomodate bolts 65 thereby providing ample space for turning of a large wing nut 69 which is tightened to secure the fence in position on the table.

Bolt 65 is free to slide along the length of slot 63 and is restrained from rotational movement by a large rectangular head 73 which is welded or otherwise secured to the bottom end of bolt 65. Head 73 runs between rails 75 extending along the length of each of slots 63 and both sides thereof. The width of bolt head 73 is slightly less than the spacing between rails 75 and may be from three-quarters inch to one inch. The length of the bolt head 73 may be from one and a half to two inches so that it cannot jam sideways in the track between rails 75.

To facilitate cutting large pieces or making long cuts parallel to the edge of a piece of stock, another scale (not shown) similar to scale 53 is preferably provided located on the inside of block 71.

The preferred mode operation of the apparatus in making a long cut will begin by moving saw 19 to the left (if necessary) so that the piece of plywood or other stock to be cut may be passed under saw guide 21. If necessary screw clamps 43 will also be raised. The desired width to which the stock is being cut will be set by moving fence 61 to the proper measurement on scale 53 at one end and to the same measurement on the scale (not shown) at the other end. Fence 61 will then be secured in place by tightening wing nuts 69. The stock to be cut will then be moved up against fence 61. The stock may also be placed up against block 51, but the lateral location of the stock is not important. The stock is then clamped in place by tightening two or more of the screw clamps 43 along the inside of saw guide 21. The stock now being held securely in place in the proper location, the long cut is made by inserting the saw 19 in the slot in saw guide 21 and also in the corresponding slot in lower saw guide 41. It will be noted that saw guide 21 and the lower saw guide 41 extend well to the left of block 51 to give room for operation of saw 19 when cutting into the left edge of the stock.

After the cut has been made the stock is removed by loosening screw clamps 43. A cut can be made to the same dimension in another piece of stock if fence 61 is left clamped in place.

From the foregoing description and explanation it will be seen that a hand power table saw is provided by the present invention which has many features which are particularly adapted for use by operators of limited manual skill but which provide such operators with the capability of making quite accurate cuts both as to length and to angle, thus permitting them to undertake projects which they would otherwise be unable to pursue effectively.

In addition to the variations and modifications of the apparatus which have been described or suggested it will be apparent to those skilled in the art that other modifications and variations may be made within the scope of the invention, and accordingly the invention is not to be deemed to be limited to the particular embodiments shown or suggested but is rather to be determined by reference to the appended claims.

What is claimed is:

1. Hand power table saw apparatus to be used in conjunction with a handsaw with a semi-rigid blade comprising substantially flat sheet material forming a horizontal work surface, support means for supporting such sheet material at least 8 inches above floor level, said sheet material being formed with a straight slot therethrough, said slot having a width greater than the thickness of said handsaw blade and having a length at least about twice the width of said handsaw blade, an upper saw guide structure including two rigid, parallel members spaced apart to form an opening of a width greater than the thickness of said handsaw blade and a length about that of said slot in said sheet material, means fixedly supporting such structure at least about one-half inch to two inches above the upper surface of said sheet material, to form an unobstructed passage for a handsaw blade between said parallel members and through said slot, a lower saw guide structure including two rigid, parallel members spaced apart to form an opening of a width greater than the thickness of said handsaw blade, said lower saw guide structure being positioned at or below the upper surface of said sheet material with its parallel members substantially parallel to the parallel members of said upper saw guide structure, and means for at least partially restraining a workpiece being sawed said means being adjustably fixed relative to said saw guide structure.

2. Hand power table saw apparatus to be used in conjunction with a handsaw with a semi-rigid blade comprising substantially flat sheet material forming a horizontal work surface, support means for supporting such sheet material at least 8 inches above floor level, said sheet material being formed with a straight slot therethrough, said slot having a width greater than the thickness of said handsaw blade and having a length at least about twice the width of said handsaw blade, an upper saw guide structure including two rigid, parallel members spaced apart to form an opening of a width greater than the thickness of said handsaw blade and a length about that of said slot in said sheet material, means fixedly supporting such structure at least about one-half inch to two inches above the upper surface of said sheet material, to form an unobstructed passage for a handsaw blade between said parallel members and through said slot, a lower saw guide structure including two rigid, parallel members spaced apart to form an opening of a width greater than the thickness of said handsaw blade, said lower saw guide structure being positioned at or below the upper surface of said sheet material with its parallel members substantially parallel to the parallel members of said upper saw guide structure, and means for at least partially restraining a workpiece being sawed, said means being adjustably fixed relative to said saw guide structure and including at least one adjustable clamp device on said upper saw guide structure acting to clamp a workpiece downwardly on said work surface and a work guide fixed on said surface at a right angle to said parallel members.

3. Hand power table saw apparatus to be used in conjunction with a handsaw with a semi-rigid blade comprising substantially flat sheet material forming a horizontal work surface, support means for supporting such sheet material at least 8 inches above floor level, said sheet material being formed with a straight slot therethrough, said slot having a width greater than the thickness of said handsaw blade and having a length at least about twice the width of said handsaw blade, an upper saw guide structure including two rigid, parallel members spaced apart to form an opening of a width greater than the thickness of said handsaw blade and a length about that of said slot in said sheet material, means fixedly supporting such structure at least about one-half inch to two inches above the upper surface of said sheet material, to form an unobstructed passage for a handsaw blade between said parallel members and through said slot, a lower saw guide structure including two rigid, parallel members spaced apart to form an opening of a width greater than the thickness of said handsaw blade, said lower saw guide structure being positioned at or below the upper surface of said sheet material with its parallel members substantially parallel to the parallel members of said upper saw guide structure, and means for at least partially restraining a workpiece being sawed, said means being adjustably fixed relative to said saw guide structure and including a rail guide on said work surface and means for clamping said rail guide in a position parallel to said parallel members at a selectable distance therefrom.

4. Apparatus as claimed in claim 3 further including a scale on said work surface arranged at right angles to said parallel members and having a portion of said rail guide adjacent said scale whereby the distance of said rail guide from the position of said handsaw blade may be determined on said scale.

5. Apparatus as claimed in claim 3 wherein said means for at least partially restraining a workpiece further includes at least one adjustable clamp device on said upper saw guide structure acting to clamp a workpiece downwardly on said work surface.

6. Apparatus as claimed in claim 5 wherein there are at least two adjustable clamp devices which are spaced apart on said upper saw guide structure lengthwise of said parallel members.

7. Apparatus as claimed in claim 2 wherein there are at least two adjustable clamp devices at approximately the same position along the length of said two rigid parallel members of said upper saw guide in proximity to said work guide with one of said clamp devices on each respective one of said parallel members.

8. Apparatus as claimed in claim 7 further including a facing material removably fixed to each of said parallel members on the sides thereof adjacent said opening said material being of moderate hardness.

9. Apparatus as claimed in claim 2 further including an adjustable clamp stop arranged to clamp on said work guide and having a stop portion adjacent said work surface against which a workpiece may be positioned to determine the distance from the end of the workpiece to the position of said handsaw blade in said saw guide structures.

10. Hand power table saw apparatus comprising a handsaw with a semi-rigid blade, substantially flat sheet material forming a horizontal work surface, support means for supporting such sheet material above floor level, said sheet material being formed with a straight slot therethrough with a width at least slightly greater than the thickness of said handsaw blade and of a length at least about twice the width of said handsaw blade, a saw guide structure including two rigid, parallel members spaced apart to form an opening of a width greater than the thickness of said handsaw blade and a length at least about twice the width of said handsaw blade, means fixedly supporting such structure at least about one-half inch to two inches above the upper surface of said sheet material to form an unobstructed passage for a handsaw blade between said parallel members and through said slot, and means for fully restraining a workpiece being sawed, said means including at least one adjustable clamp device on said saw guide structure acting to clamp a workpiece downwardly on said work surface and a work guide fixed on said surface at a predetermined angle to said parallel members.

11. Apparatus as claimed in claim 10 wherein there are at least two adjustable clamp devices at approximately the same position along said two rigid, parallel members with one of said clamp devices on each respective one of said parallel members.

12. Apparatus as claimed in claim 10 further including an adjustable clamp stop arranged to clamp on said work guide and having a stop portion adjacent said work surface against which a workpiece may be positioned to determine the distance from the end of the workpiece to the position of said handsaw blade in said saw guide structure.

13. Apparatus as claimed in claim 10 further including a second saw guide structure similar to the first said saw guide structure and directly below it under said work surface.

14. Apparatus as claimed in claim 13 wherein said nondetermined angle is an angle of 90°.

15. Apparatus as claimed in claim 10 wherein said means for restraining a workpiece further includes a rail guide on said work surface and means for clamping said rail guide in a position parallel to said parallel members at a selectable distance therefrom.

16. Apparatus as claimed in claim 10 wherein there are at least two adjustable clamp devices which are spaced apart on said saw guide structure lengthwise of said parallel members.

17. Apparatus as claimed in claim 10 further including a facing material removably fixed to each of said parallel members on the sides thereof adjacent said opening said material being of moderate hardness.

* * * * *